(12) United States Patent
Akahori

(10) Patent No.: US 7,224,755 B2
(45) Date of Patent: May 29, 2007

(54) METHOD AND APPARATUS FOR GENERATING A FREQUENCY CONTROL SIGNAL

(75) Inventor: Hiroji Akahori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 785 days.

(21) Appl. No.: 10/456,528

(22) Filed: Jun. 9, 2003

(65) Prior Publication Data
US 2003/0231724 A1    Dec. 18, 2003

(30) Foreign Application Priority Data
Jun. 14, 2002  (JP)  ............. 2002-173857

(51) Int. Cl.
*H04L 27/06*  (2006.01)
(52) U.S. Cl. ........... 375/344; 455/182.2; 455/192.2; 455/313; 331/175
(58) Field of Classification Search ......... 375/316, 375/344; 455/164.1, 182.1, 182.2, 192.1, 455/192.2, 131, 191.1, 313; 331/175, 1 R
See application file for complete search history.

(56) References Cited

U.S. PATENT DOCUMENTS

| | | | |
|---|---|---|---|
| 5,917,864 A * | 6/1999 | Asahara | 375/344 |
| 6,490,010 B1 * | 12/2002 | Shibuya et al. | 348/735 |
| 6,631,174 B1 * | 10/2003 | Asahara et al. | 375/344 |
| 6,748,037 B1 * | 6/2004 | Katoh et al. | 375/344 |
| 6,847,688 B1 * | 1/2005 | Molnar et al. | 375/344 |
| 6,996,156 B1 * | 2/2006 | Ono | 375/147 |

FOREIGN PATENT DOCUMENTS

| | | |
|---|---|---|
| JP | 2001-223610 | 8/2001 |
| JP | 2002-111541 | 4/2002 |

* cited by examiner

Primary Examiner—Jean B. Corrielus
(74) Attorney, Agent, or Firm—Volentine & Whitt, P.L.L.C.

(57) ABSTRACT

A receiver including a frequency converter which converts a frequency of a received signal according to a control signal to obtain a frequency-converted received signal, and an AFC (automatic frequency controller) which converts the frequency-converted received signal into a data converted signal, which compares respective phases of the data converted signal and a previous data converted signal to generate a first phase difference value, which compares respective phases of the data converted signal and the previous data converted signal to generate a second phase difference value, which generates a loop gain value according to the first and second phase difference values, and which generates the control signal according to the first phase difference value and the loop gain value.

20 Claims, 4 Drawing Sheets

METHOD AND APPARATUS FOR GENERATING A FREQUENCY CONTROL SIGNAL

BACKGROUND OF THE INVENTION

1. Field of the Invention

The present invention relates, in general, to a frequency control circuit, and, more particularly, to a receiver and circuit for generating a frequency control signal and method of generating a frequency control signal.

This is a counterpart of and claims priority to Japanese patent application Ser. No. 173857/2002, filed on Jun. 14, 2002, the subject matter of which is incorporated herein by reference.

2. Description of the Related Art

A conventional receiver has only one phase difference operation circuit and an integration circuit. By the way, the conventional receiver must satisfy the following two requirements to generate a signal having a stable frequency. The first is that when a carrier difference (phase difference is larger than a threshold value, the integration circuit is supplied with a large value causing the carrier difference to be converged. The second is that when the carrier difference approaches the convergence, the integration circuit is supplied with a small value. To satisfy the above requirements, the integration circuit in the conventional receiver is supplied with a phase difference which is generated by the phase difference operation circuit, multiplied by a loop gain value.

However, the conventional loop gain value is merely generated by an unreliable control, for example, time control. Therefore, the conventional receiver lacks stability.

SUMMARY OF THE INVENTION

According to one aspect of the present invention, there is provided a receiver including a frequency converter which converts a frequency of a received signal according to a control signal to obtain a frequency-converted received signal, a data conversion circuit which converts the frequency-converted received signal into a data converted signal, a first phase difference operation circuit which compares respective phases of the data converted signal and a previous data converted signal to generate a first phase difference value, a second phase difference operation circuit which compares respective phases of the data converted signal and the previous data converted signal to generate a second phase difference value, a gain condition generator which generates first and second gain condition values according to the first and second phase difference values, a loop gain setting circuit which generates a loop gain value according to the first and second gain condition values, and a controller which generates the control signal according to the first phase difference value and the loop gain value.

DETAILED DESCRIPTION OF THE PREFERRED EMBODIMENTS

The preferred embodiments of the present invention will be described. However, the invention is not limited to the specific embodiments. Moreover, not all the combinations of the characteristics of the present invention described in the embodiments are essential to the present invention.

Figure 1:
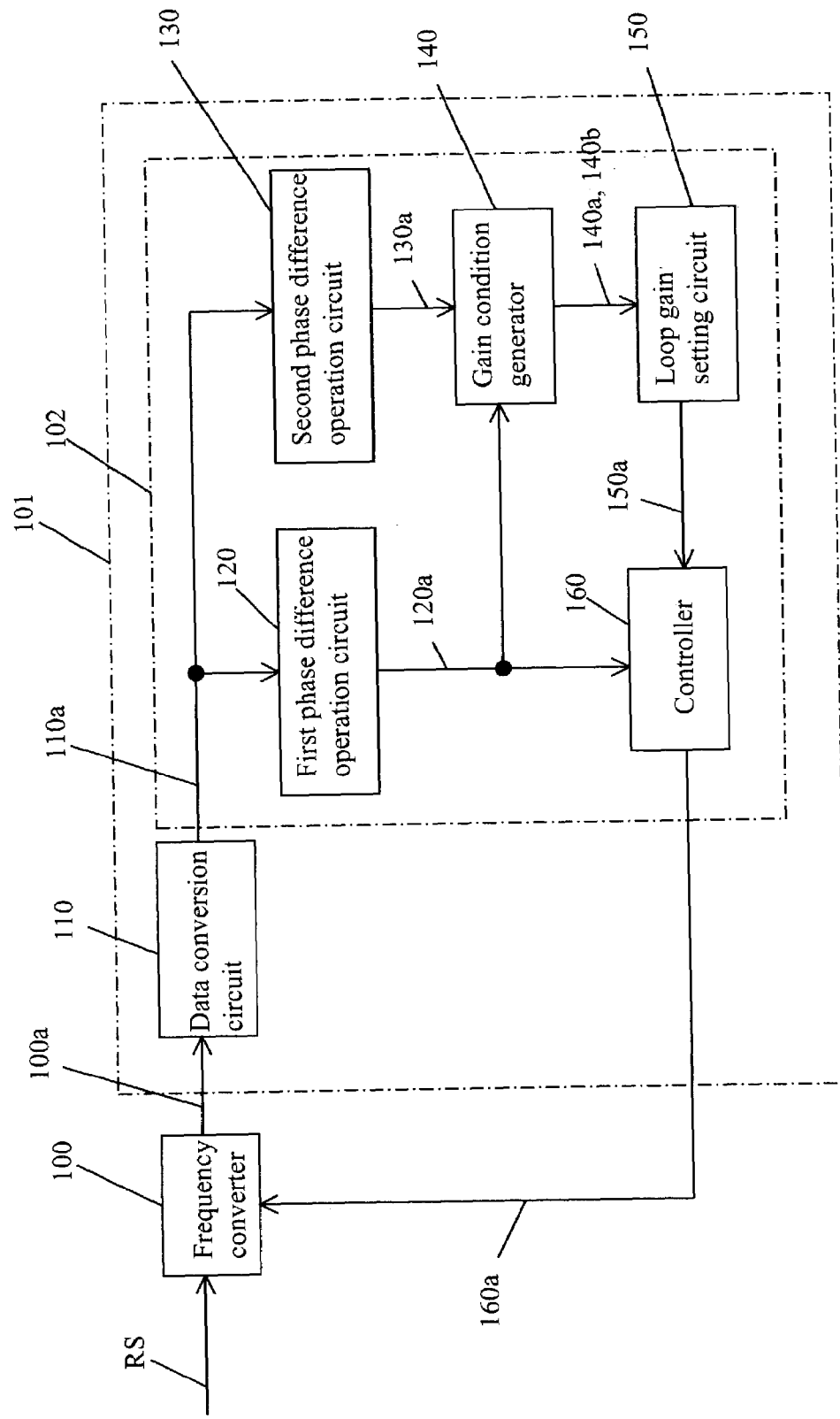
FIG. 1 is a block diagram of a receiver according to the present invention.
Figure 2:
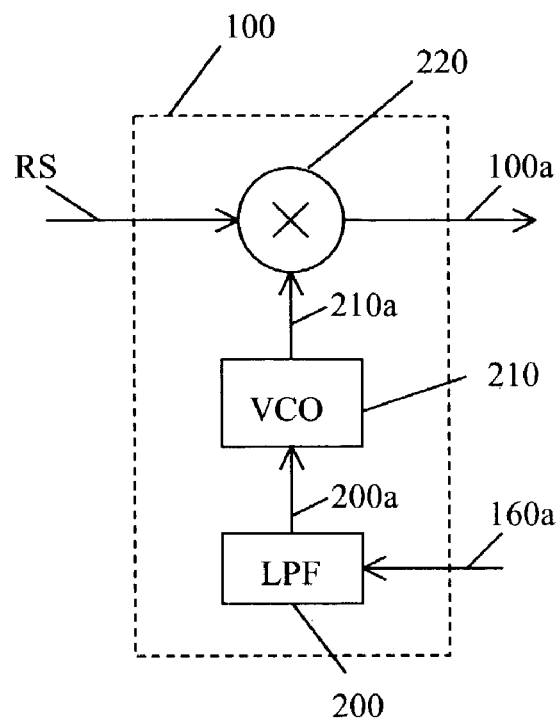
FIG. 2 is a block diagram of a frequency converter according to the present invention.
Figure 3:
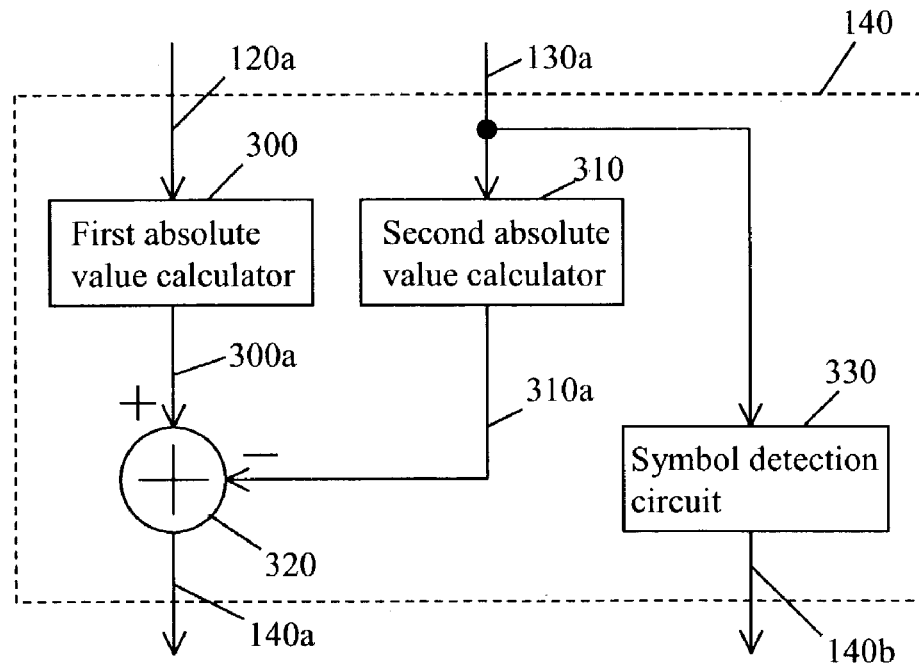
FIG. 3 is a block diagram of a gain condition generator according to the present invention.
Figure 5:
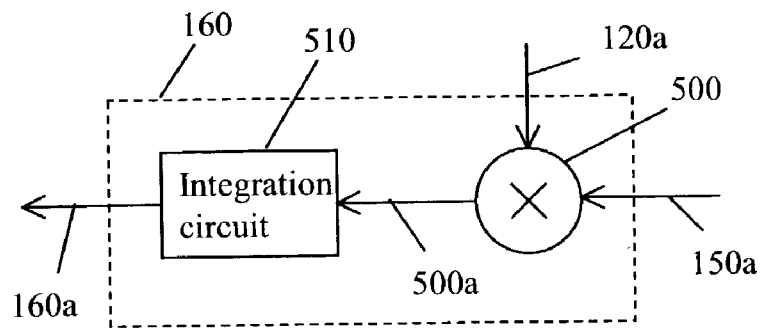
FIG. 5 is a block diagram of a controller according to the present invention.
Figure 4:
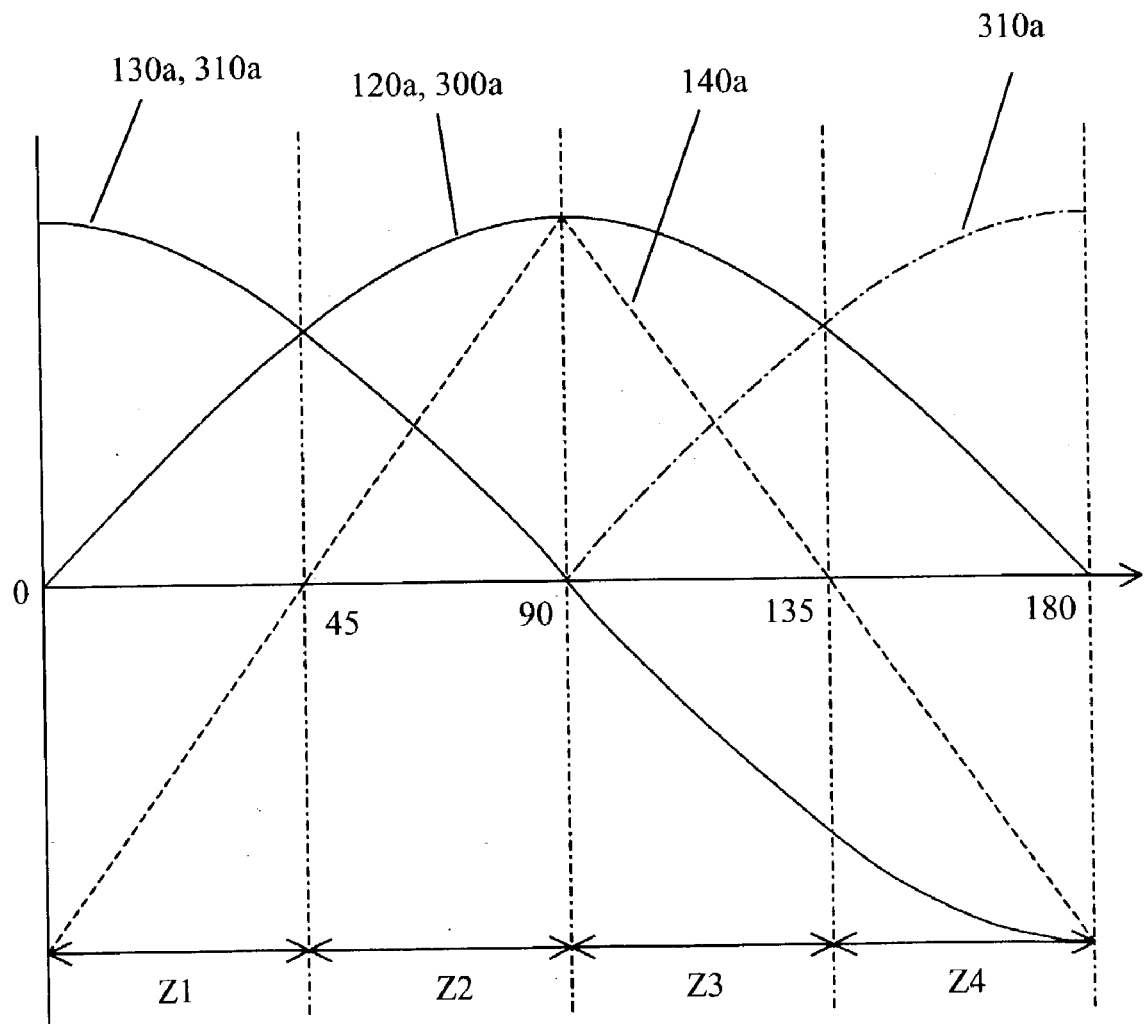
FIG. 4 is a timing chart for explaining of the operation of the gain condition generator according to the present invention.
Figure 6:
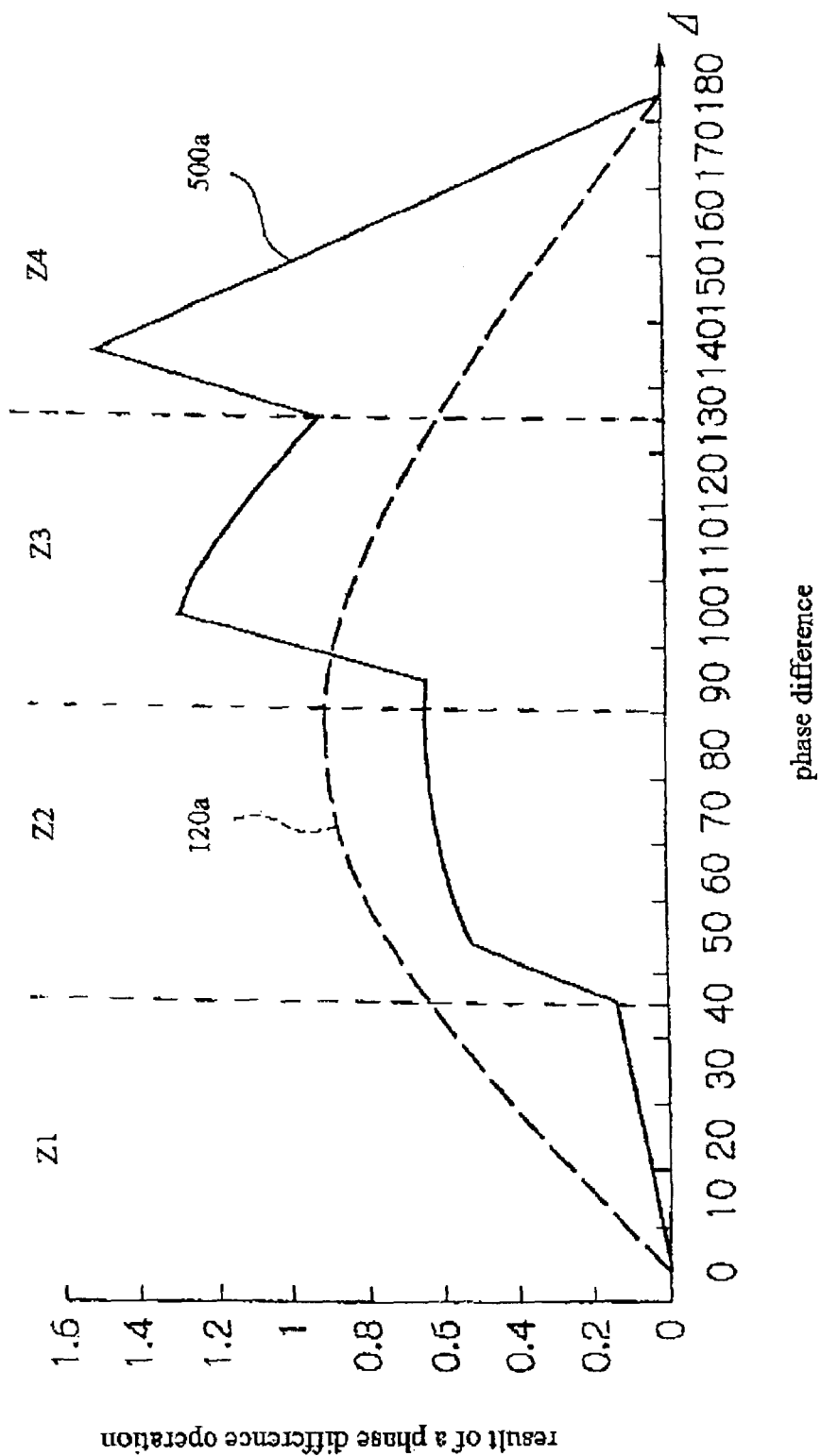
FIG. 6 is a timing chart for explaining operation of a multiplier according to the present invention.

A receiver according to the present invention will be described with reference to FIGS. 1–6. FIG. 1 is a block diagram of a receiver according to the present invention. FIG. 2 is a block diagram of a frequency converter according to the present invention. FIG. 3 is a block diagram of a gain condition generator according to the present invention. FIG. 4 is a timing chart for explaining of the operation of the gain condition generator according to the present invention. FIG. 5 is a block diagram of a controller according to the present invention. FIG. 6 is a timing chart for explaining operation of a multiplier according to the present invention.

A receiver according to the present invention comprises a frequency converter 100 and an AFC (automatic frequency controller) 101. The AFC 101 comprises a data conversion circuit 110 and a circuit 102 for generating a frequency control signal. The circuit 102 comprises a first phase difference operation circuit 120, a second phase difference operation circuit 130, a gain condition generator 140, a loop gain setting circuit 150 and a controller 160.

The frequency converter 100 converts a frequency of a received signal RS according to a control signal 160a to obtain a frequency-converted received signal 100a. As shown in FIG. 2, the frequency converter 100 comprises a LPF (low-pass filter) 200, a VCO (voltage-controlled oscillator) 210 and a mixer 220. The LPF 200 generates a voltage control signal 200a according to the control signal 160a. The LPF 200 is a filter that cuts off high frequency components which cause distortion in the control signal 160a, which is an analog signal. Therefore, the voltage control signal 200a does not have distortion. The VCO 210 generates a carrier signal 210a according to the voltage control signal 200a. The mixer 220 downconverts the received signal RS in synchronization with the carrier signal 210a, and generates the frequency-converted received signal 100a which is the received signal RS converted into an intermediate frequency or a base band frequency. By the way, it is possible that the mixer 220 may have a quadrature demodulation function, causing an in-phase component and a quadrature component to be generated.

The data conversion circuit 110 is coupled to the frequency converter 100, and has an inverse transfer function. The data conversion circuit 110 converts a data form of a signal input thereto according to a multiple access method (so-called inverse transform). For example, the multiple access method may be a TDMA (Time Division Multiple Access) method, a FDMA (Frequency Division Multiple Access) method ora CDMA (Code Division Multiple Access) method. Therefore, the data conversion circuit 110 generates a data converted signal 110a which has an in-phase component I and a quadrature phase component Q for each symbol.

The first phase difference operation circuit 120 is coupled with the data conversion circuit 110, and has a calculation function and a memory function. The calculation function is a sine wave function. The memory function temporarily stores phase components of each symbol. Then, the first phase difference operation circuit 120 compares respective phases of the data converted signal and a previous data converted signal to generate a first phase difference value 120a using the calculation function and the memory function. Concretely, the first phase difference operation circuit 120 generates the first phase difference value (Δ1) 120a in accordance with the following equation:

$$\Delta 1 = \sin(\theta 2 - \theta 1) = (\sin \theta 2 * \cos \theta 1) - (\cos \theta 2 * \sin \theta 1) = (Q2*I1) - (I2*Q1);$$

wherein I1=(Cos θ1) is an in-phase component of a previous input signal, Q1=(Sin θ1) is a quadrature phase component of the previous input signal, I2=(Cos θ2) is an in-phase component of the input signal, and Q2=(Sin θ2) is a quadrature phase component of the input signal.

The second phase difference operation circuit 130 is coupled with the data conversion circuit 110, and has a calculation function and a memory function. The calculation function is a cosine wave function. The memory function temporarily stores phase components of each symbol. Then, the second phase difference operation circuit 130 compares respective phases of the data converted signal and the previous data converted signal to generate a second phase difference value 130a using the calculation function and the memory function. Concretely, the second phase difference operation circuit 130 generates the second phase difference value (Δ2) 130a in accordance with the following equation:

$$\Delta 2 = \cos(\theta 2 - \theta 1) = (\cos \theta 2 * \cos \theta 1) + (\sin \theta 2 * \sin \theta 1) = (I2*I1) + (Q2*Q1);$$

wherein I1=(Cos θ1) is an in-phase component of the previous input signal, Q1=(Sin θ1) is a quadrature phase component of the previous input signal, I2=(Cos θ2) is an in-phase component of the input signal, and Q2=(Sin θ2) is a quadrature phase component of the input signal.

The gain condition generator 140 is coupled with the first and second phase difference operation circuits 120 and 130, and generates first and second gain condition values 140a and 140b according to the first and second phase difference values 120a and 130a. As shown in FIG. 3, the gain condition generator 140 comprises a first absolute value calculator 300, a second absolute value calculator 310, a subtraction circuit 320 and a symbol detection circuit 330. The first absolute value calculator 300 generates an absolute value of the first phase difference value 120a, and outputs it as a first absolute value 300a. The second absolute value calculator 310 generates an absolute value of the second phase difference value 130a, and outputs it as a second absolute value 310a. The subtraction circuit 320 subtracts the second absolute value 310a from the first absolute value 300a. The subtraction circuit 320 generates the difference between the first absolute value 300a and the second absolute value 310a, and outputs it as the first gain condition value 140a. The symbol detection circuit 330 decides a symbol of the second phase difference value 130a, and generates the second gain condition value 140b. FIG. 4 shows a relationship between a phase difference and each value. The first phase difference value 120a and the first absolute value 300a have the same locus from a 0° to 180°. Similarly, the second phase difference value 130a and the second absolute value 310a have the same locus from 0° to 90°, but they have a differential locus from 90° to 180°.

The loop gain setting circuit 150 is coupled with the gain condition generator 140, and generates a loop gain value 150a according to the first and second gain condition values 140a and 140b. As shown in FIG. 4, there are four combinations Z1–Z4 in the first and second gain condition values 140a and 140b.

In the range Z1, the first gain condition value 140a is negative, and the second gain condition value 140b is positive. In other words, the second absolute value 310a is greater than the first absolute value 300a, and the second phase difference value 130a is positive. In this case, the loop gain setting circuit 150 generates a first loop value 150a which is the smallest value, for example, 0.2.

In the range Z2, the first gain condition value 140a is positive, and the second gain condition value 140b is positive. In other words, the second absolute value 310a is less than the first absolute value 300a, and the second phase difference value 130a is positive. In this case, the loop gain setting circuit 150 generates a second loop value 150a which is greater than the first loop value, for example, 0.7.

In the range Z3, the first gain condition value 140a is positive, and the second gain condition value 140b is negative. In other words, the second absolute value 310a is less than the first absolute value 300a, and the second phase difference value 130a is negative. In this case, the loop gain setting circuit 150 generates a third loop value 150a which is greater than the second loop value, for example, 1.

In the range Z4, the first gain condition value 140a is negative, and the second gain condition value 140b is negative. In other words, the second absolute value 310a is greater than the first absolute value 300a, and the second phase difference value 130a is negative. In this case, the loop gain setting circuit 150 generates a fourth loop value 150a which is the largest value, for example, 3.

The controller 160 is coupled with the first phase difference operation circuit 120 and the loop gain setting circuit 150, and generates the control signal 160a according to the first phase difference value 120a and the loop gain value 150a. As shown in FIG. 5, the controller 160 comprises a multiplier 500 and an integration circuit 510. The multiplier 500 multiplies the first phase difference value 120a and the loop gain value 150a together, and generates a multiplication result 500a. The integration circuit 510 integrates the multiplication result 500a, and generates the control signal 160a which is an analog signal.

FIG. 6 shows a relationship between the first phase difference value 120a and the multiplication result (a result of a phase difference operation) 500a. As shown in FIG. 6, in the ranges Z1 and Z2, the value of the multiplication result 500a is small. On the other hand, in the ranges Z3 and Z4, the value of the multiplication result 500a is large. In other words, when the phase difference is small, the value of the multiplication result 500a is also small. When the phase difference is large, the value of the multiplication result 500a is also large. Therefore, the receiver of the present invention causes the value of the loop gain data to be small when the phase difference is small, and causes the value of the loop gain data to be large when the phase difference is large.

By the way, in FIG. 6, the data conversion circuit 110 is an inverse transform circuit. Therefore, the symbol value (attitude) which is output by the inverse transform circuit is offset by inverting chip data in the inverse transform circuit. Therefore, when the phase difference is 180°, the result of a phase difference operation is 0. So, the larger the phase difference is, the smaller the result is.

The receiver and the circuit for generating a frequency control signal of the present invention accurately control a gain value for hastening convergence of phase difference and for raising stability of a convergence state of phase difference according to a value of phase difference. Therefore, the receiver and the circuit of the present invention control the gain with high certainty and repeatability.

While the preferred form of the present invention has been described, it is to be understood that modifications will be apparent to those skilled in the art without departing from the spirit of the invention.

The scope of the invention, therefore, is to be determined solely by the following claims.

What is claimed:

1. A receiver, comprising:
   a frequency converter which converts a frequency of a received signal according to a control signal to obtain a frequency-converted received signal; and
   an AFC (automatic frequency controller) which converts the frequency-converted received signal into a data converted signal, which compares respective phases of the data converted signal and a previous data converted signal to generate a first phase difference value, which compares respective phases of the data converted signal and the previous data converted signal to generate a second phase difference value, which generates a loop gain value according to the first and second phase difference values, and which generates the control signal according to the first phase difference value and the loop gain value.

2. The receiver according to claim 1, wherein said AFC comprises:
   a first phase difference operation circuit that generates the first phase difference value in accordance with the following equation:

(Q2*I1)−(I2*Q1); and a second phase difference operation circuit that generates the second phase difference value in accordance with the following equation:

(I1*I2)+(Q1*Q2), wherein I1 is an in-phase component of the previous data converted signal, Q1 is a quadrature phase component of the previous data converted signal, I2 is an in-phase component of the data converted signal, and Q2 is a quadrature component of the data converted signal.

3. A receiver, comprising:
   a frequency converter which converts a frequency of a received signal according to a control signal to obtain a frequency-converted received signal;
   a data conversion circuit, coupled with the frequency converter, which converts the frequency-converted received signal into a data converted signal;
   a first phase difference operation circuit, coupled with the data conversion circuit, which compares respective phases of the data converted signal and a previous data converted signal to generate a first phase difference value;
   a second phase difference operation circuit, coupled with the data conversion circuit, which compares respective phases of the data converted signal and the previous data converted signal to generate a second phase difference value;
   a gain condition generator, coupled with the first and second phase difference operation circuits, which generates first and second gain condition values according to the first and second phase difference values;
   a loop gain setting circuit, coupled with the gain condition generator, which generates a loop gain value according to the first and second gain condition values; and
   a controller, coupled with the first phase difference operation circuit and the loop gain setting circuit, which generates the control signal according to the first phase difference value and the loop gain value.

4. The receiver according to claim 3, wherein said first phase difference operation circuit generates the first phase difference value in accordance with the following equation:

(Q2*I1)−(I2*Q1);

and wherein said second phase difference operation circuit generates the second phase difference value in accordance with the following equation:

(I1*I2)+(Q1*Q2), wherein I1 is an in-phase component of the previous data converted signal, Q1 is a quadrature phase component of the previous data converted signal, I2 is an in-phase component of the data converted signal, and Q2 is a quadrature component of the data converted signal.

5. The receiver according to claim 3, wherein the gain condition generator comprises:
   a first absolute value calculator which generates a first absolute value according to the first phase difference value;
   a second absolute value calculator which generates a second absolute value according to the second phase difference value;
   a subtraction circuit which generates the first gain condition value according to the first and second absolute values; and
   a symbol detection circuit which generates the second gain condition value according to a symbol of the second phase difference value.

6. The receiver according to claim 3, wherein the loop gain setting circuit generates a first loop gain value when the first gain condition value is negative and when the second gain condition value is positive, a second loop gain value when the first gain condition value is positive and when the second gain condition value is positive, a third loop gain value when the first gain condition value is positive and when the second gain condition value is negative, and a fourth loop gain value when the first gain condition value is negative and when the second gain condition value is negative.

7. The receiver according to claim 6, wherein the first loop gain value is smaller than the second loop gain value, wherein the second loop gain value is smaller than the third loop gain value, and wherein the third loop gain value is smaller than the fourth loop gain value.

8. The receiver according to claim 3, wherein the controller comprises:
   a multiplier which generates a multiplication result according to the first phase difference value and the loop gain value; and
   an integration circuit which generates the control signal according to the multiplication result.

9. The receiver according to claim 3, wherein the frequency converter comprises:
   a low-pass filter which generates a voltage control signal according to the control signal;
   a voltage-controlled oscillator which generates a carrier signal according to the voltage control signal; and
   a mixer which converts the received signal according to the carrier signal, to generate the frequency-converted received signal.

10. A circuit for generating a frequency control signal based on an input signal, the input signal having an in-phase component and a quadrature component, the circuit comprising:

a first phase difference operation circuit which generates a first phase difference value in accordance with the following equation:

(Q2*I1)−(I2*Q1);

a second phase difference operation circuit which generates a second phase difference value in accordance with the following equation:

(I1*I2)+(Q1*Q2), wherein I1 is an in-phase component of a previous input signal, Q1 is a quadrature component of the previous input signal, I2 is an in-phase component of the input signal, and Q2 is a quadrature component of the input signal;

a gain condition generator, coupled with the first and second phase difference operation circuits, which generates first and second gain condition values according to the first and second phase difference values;

a loop gain setting circuit, coupled with the gain condition generator, which generates a loop gain value according to the first and second gain condition values; and a controller, coupled with the first phase difference operation circuit and the loop gain setting circuit, which generates the frequency control signal according to the first phase difference value and the loop gain value.

11. The circuit according to claim 10, wherein the gain condition generator comprises:

a first absolute value calculator which generates a first absolute value according to the first phase difference value;

a second absolute value calculator which generates a second absolute value according to the second phase difference value;

a subtraction circuit which generates the first gain condition value according to the first and second absolute values; and a symbol detection circuit which generates the second gain condition value according to a symbol of the second phase difference value.

12. The circuit according to claim 10, wherein the loop gain setting circuit generates a first loop gain value when the first gain condition value is negative and when the second gain condition value is positive, a second loop gain value when the first gain condition value is positive and when the second gain condition value is positive, a third loop gain value when the first gain condition value is positive and when the second gain condition value is negative, and a fourth loop gain value when the first gain condition value is negative and when the second gain condition value is negative.

13. The circuit according to claim 12, wherein the first loop gain value is smaller than the second loop gain value, wherein the second loop gain value is smaller than the third loop gain value, and wherein the third loop gain value is smaller than the fourth loop gain value.

14. The circuit according to claim 10, wherein the controller comprises:

a multiplier which generates a multiplication result according to the first phase difference value and the loop gain value; and an integration circuit which generates the frequency control signal according to the multiplication result.

15. A method for generating a frequency control signal, comprising;

converting a frequency of a received signal according to the frequency control signal to obtain a frequency-converted received signal;

converting the frequency-converted received signal into a data converted signal;

comparing respective phases of the data converted signal and a previous data converted signal to generate a first phase difference value;

comparing respective phases of the data converted signal and the previous data converted signal to generate a second phase difference value;

generating first and second gain condition values according to the first and second phase difference values;

generating a loop gain value according to the first and second gain condition values; and generating the frequency control signal according to the first phase difference value and the loop gain value.

16. The method according to claim 15, wherein said first phase difference value is generated in accordance with the following equation:

(Q2*I1)−(I2*Q1);

and wherein said second phase difference value is generated in accordance with the following equation:

(I1*I2)+(Q1*Q2), wherein I1 is an in-phase component of the previous data converted signal, Q1 is a quadrature phase component of the previous data converted signal, I2 is an in-phase component of the data converted signal, and Q2 is a quadrature component of the data converted signal.

17. The method according to claim 15, wherein said generating the first and second gain condition values comprises:

generating a first absolute value according to the first phase difference value;

generating a second absolute value according to the second phase difference value;

generating the first gain condition value according to the first and second absolute values; and generating the second gain condition value according to a symbol of the second phase difference value.

18. The method according to claim 15, wherein said generating the loop gain value comprises:

generating a first loop gain value when the first gain condition value is negative and when the second gain condition value is positive;

generating a second loop gain value when the first gain condition value is positive and when the second gain condition value is positive;

generating a third loop gain value when the first gain condition value is positive and when the second gain condition value is negative; and generating a fourth loop gain value when the first gain condition value is negative and when the second gain condition value is negative.

19. The method according to claim 18, wherein the first loop gain value is smaller than the second loop gain value, wherein the second loop gain value is smaller than the third loop gain value, and wherein the third loop gain value is smaller than the fourth loop gain value.

20. The method according to claim 15, wherein said generating the frequency control signal comprises:

generating a multiplication result according to the first phase difference value and the loop gain value; and providing the frequency control signal according to the multiplication result.

* * * * *